(12) United States Patent
Risuleo

(10) Patent No.: US 12,067,364 B2
(45) Date of Patent: Aug. 20, 2024

(54) DYNAMICALLY GENERATING FEATURE VECTORS FOR DOCUMENT OBJECT MODEL ELEMENTS

(71) Applicant: Klarna Bank AB, Stockholm (SE)

(72) Inventor: Riccardo Sven Risuleo, Stockholm (SE)

(73) Assignee: Klarna Bank AB, Stockholm (SE)

( * ) Notice: Subject to any disclaimer, the term of this patent is extended or adjusted under 35 U.S.C. 154(b) by 214 days.

(21) Appl. No.: 17/715,882

(22) Filed: Apr. 7, 2022

(65) Prior Publication Data

US 2023/0325598 A1 Oct. 12, 2023

(51) Int. Cl.
*G06F 17/00* (2019.01)
*G06F 40/143* (2020.01)
*G06F 40/166* (2020.01)
*G06F 40/242* (2020.01)
*G06F 40/284* (2020.01)
*G06N 5/022* (2023.01)

(52) U.S. Cl.
CPC .......... *G06F 40/284* (2020.01); *G06F 40/143* (2020.01); *G06F 40/166* (2020.01); *G06F 40/242* (2020.01); *G06N 5/022* (2013.01)

(58) Field of Classification Search
None
See application file for complete search history.

(56) References Cited

U.S. PATENT DOCUMENTS

| | | | |
|---|---|---|---|
| 8,639,680 B1 * | 1/2014 | Ciccolo | G06F 16/951 707/723 |
| 9,336,279 B2 * | 5/2016 | Ciccolo | G06F 16/24578 |
| 2020/0097261 A1 * | 3/2020 | Smith | G06F 40/174 |
| 2021/0184976 A1 * | 6/2021 | Manjunatha | G06Q 10/04 |

FOREIGN PATENT DOCUMENTS

WO WO-2020061586 A1 * 3/2020 ........... G06F 40/174

* cited by examiner

*Primary Examiner* — Satwant K Singh
(74) *Attorney, Agent, or Firm* — Davis Wright Tremaine LLP

(57) ABSTRACT

A plurality of HyperText Markup Language (HTML) strings corresponding to a dataset of document object model (DOM) nodes is tokenized according to a tokenization scheme to produce a dictionary of tokens that occur in the dataset. A condensed dictionary of tokens in produced by removing low-value tokens from the vocabulary of tokens. An information matrix is computed based on the condensed dictionary of tokens, the information matrix being a set of values, a value of the set of values corresponding to a frequency of co-occurrence of a pair of tokens. A library of word vectors is derived from the information matrix. A feature vector of an HTML element is generated based at least in part on the library of word vectors, and a classification for the HTML element is obtained from a machine learning model as a result of inputting the feature vector into the machine learning model.

20 Claims, 10 Drawing Sheets

DYNAMICALLY GENERATING FEATURE VECTORS FOR DOCUMENT OBJECT MODEL ELEMENTS

BACKGROUND

When applying machine learning methods, one central problem is feature engineering. Because a machine learning algorithm typically takes, as inputs, vectors of numbers ("features") and outputs numbers, a human operator is often responsible for turning whatever data is being processed into vectors of features according to some meaningful method. This process can be difficult, and labor and time-consuming, particularly in the field of automating interaction with web pages given the sheer number of features as well as the non-standardization of elements in the average web page. Therefore, a need exists to train machine learning algorithms more efficiently and for the trained machine learning algorithms to create feature vectors for document object model tree hierarchy elements dynamically.

BRIEF DESCRIPTION OF THE DRAWINGS

Various techniques will be described with reference to the drawings, in which.

DETAILED DESCRIPTION

Figure 1:
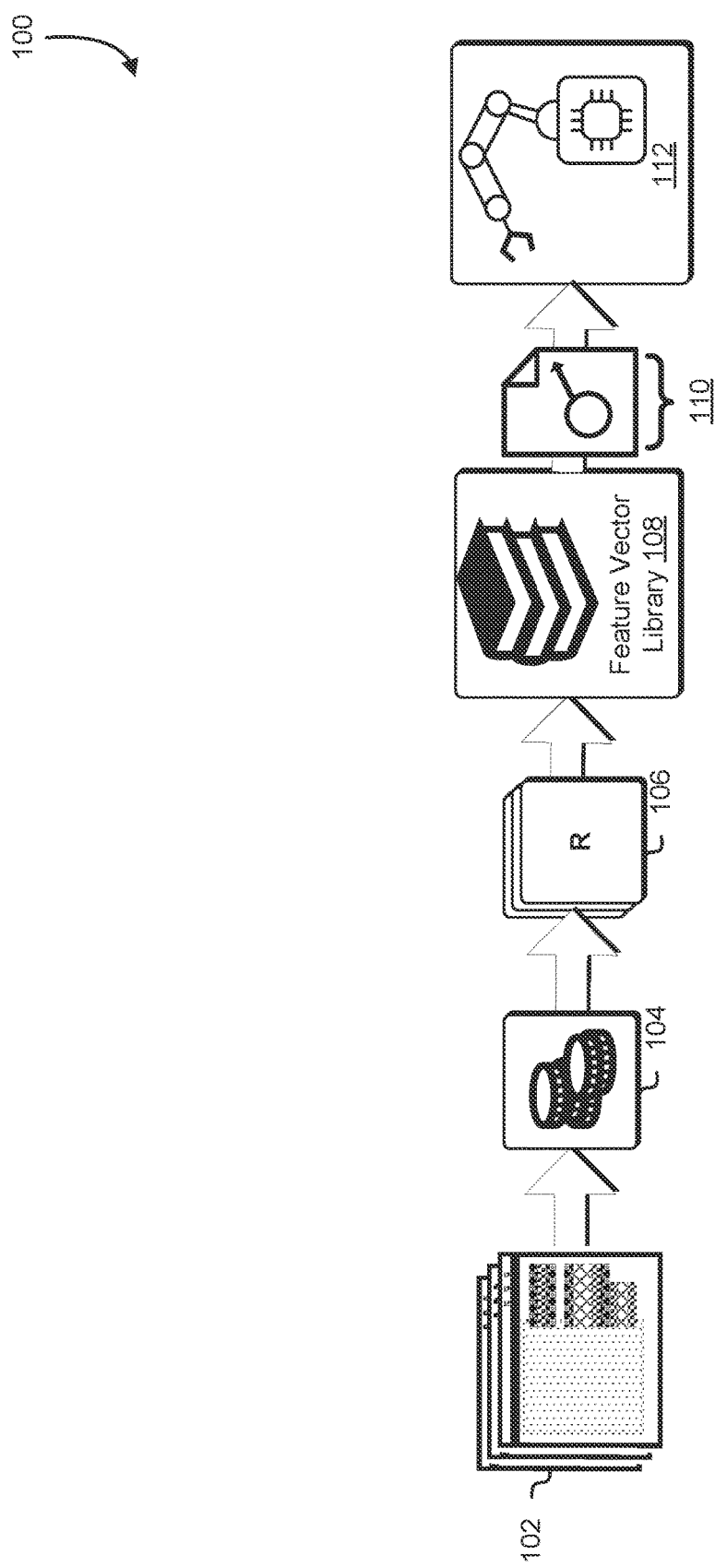
FIG. 1 illustrates an example of training web-element predictors in accordance with an embodiment.

Techniques and systems described below relate to a system that creates feature vectors for document object model tree elements in an unsupervised fashion for use in training and using web element predictors of machine learning algorithms. In one example, a plurality of HyperText Markup Language (HTML) strings corresponding to a dataset of HTML elements are tokenized according to a tokenization scheme to produce a vocabulary of tokens that occur in the dataset. In the example, a pruned vocabulary of tokens is produced by removing low-value tokens from the vocabulary of tokens.

Further in the example, an information matrix is computed based on the pruned vocabulary of tokens, where the information matrix is a set of values and a value of the set of values corresponds to a frequency of co-occurrence of a pair of tokens within a same HTML string. Still in the example, a library of word vectors is derived from the information matrix. Still further in the example, an HTML string of an HTML element of a web page is obtained. Also in the example, the HTML string is transformed into a feature vector suitable to input into a machine learning algorithm by at least tokenizing the HTML string into a set of tokens according to the tokenization scheme and iterating over the set of tokens to generate a set of word vectors, computing the feature vector by aggregating the set of word vectors according to a reduction function. Finally, in the example, a classification for the HTML element from the machine learning model is obtained as a result of inputting the feature vector into a machine learning model trained to classify HTML elements.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of machine learning, by automatically determining which tokens derived from an HTML element are most useful to a machine learning model for identifying and classifying HTML elements. Additionally, techniques described and suggested in the present disclosure improve the efficiency of training machine learning algorithms by operating in an unsupervised manner without the need for resource-intensive feature engineering. Moreover, techniques described and suggested in the present disclosure are necessarily rooted in computer technology in order to overcome problems specifically arising with web automation software to identify the correct HTML element to simulated human interaction with by identifying and extracting the most determinative tokens from the HTML element. Furthermore, the techniques of the present disclosure are task agnostic and can be various purposes where web page elements need to be input into machine learning algorithms. Additionally, the resulting features have a geometric structure that can be leveraged and scaled as needed.

FIG. 1 illustrates an example of training web-element predictors in accordance with an embodiment. As illustrated in FIG. 1, the environment may include elements of one or more web pages 102 that are input into a tokenizer 104 that tokenizes (derives a set of tokens from) the elements, whereupon the resulting set of tokens are reduced by a reduction module 106. The reduced set of tokens may become the bases for a feature vector library 108, which may be utilized to generate feature vectors that can be input to a machine learning model 112. The machine learning model can be trained to provide various outputs according to such feature vector input, such as outputs that make identification and classification predictions of HTML elements.

The one or more web pages 102 may be user interfaces to one or more computing resource services available on the Internet. A user may interact with the one or more web pages 102 using an input device, such as a mouse, keyboard, or touch screen. The one or more web pages 102 may include various interface elements, such as text, images, links, tables, and the like. In an example, the one or more web pages 102 may operate as interfaces to a service of an online merchant (also referred to as an online merchant service)

that allows a user to obtain, exchange, or trade goods and/or services with the online merchant and/or other users of the online merchant service.

Additionally, or alternatively, the one or more web pages 102 may allow a user to post messages and upload digital images and/or videos to servers of the entity hosting the one or more web pages 102. In another example, the one or more web pages 102 may operate as interfaces to a social networking service that enables a user to build social networks or social relationships with others who share similar interests, activities, backgrounds, or connections with others. Additionally, or alternatively, the one or more web pages 102 may operate as interfaces to a blogging or microblogging service that allows a user to transfer content, such as text, images, or video. Additionally, or alternatively, the one or more web pages 102 may be interfaces to a messaging service that allow a user to send text messages, voice messages, images, documents, user locations, live video, or other content to others.

In various embodiments, the one or more web pages 102 may be obtained (e.g., by downloading via a network such as the Internet) and the system of the present disclosure may extract various interface elements, such as HyperText Markup Language (HTML) elements, from the one or more web pages 102. In some implementations, the system of the present disclosure may obtain the one or more web pages 102 automatically, whereas in other implementations, another system or a human operator may obtain the one or more web pages 102 for the system of the present disclosure.

A dataset of HTML elements may be derived from a plurality of web pages (e.g., the one or more web pages 102) from a plurality of websites. The one or more web pages 102 may be at least one web page hosted on a service platform. In some examples, a "service platform" (or just "platform") refers to software and/or hardware through which a computer service implements its services for its users. In embodiments, the various form elements of the one or more web pages 102 may be organized into a document object model (DOM) tree hierarchy with nodes of the DOM tree representing web page elements. In some examples, the interface element may correspond to a node of an HTML form.

In some examples, a node represents information that is contained in a DOM or other data structure, such as a linked list or tree. Examples of information include, but are not limited to, a value, a clickable element, an event listener, a condition, an independent data structure, various HTML elements, etc. In some examples, a form element refers to clickable elements which may be control objects that, when activated (such as by clicking or tapping), cause the one or more web pages 102 or any other suitable entity to elicit a response. In some examples, an interface element is associated with one or more event listeners which may be configured to elicit a response from the one or more web pages 102 or any other suitable entity. In some examples, an event listener may be classified by how the one or more web pages 102 responds. As an illustrative example, the one or more web pages 102 may include interfaces to an online library and the one or more web pages 102 may have nodes involving "Add to Queue" buttons, which may have event listeners that detect actual or simulated interactions (e.g., mouse clicks, mouse over, touch events, etc.) with the "Add to Queue" buttons. In the present disclosure, various elements may be classified into different categories. For example, certain elements of the one or more web pages 102 that have, when interacted with, the functionality of adding an item to a queue, may be classified as "Add to Queue" elements, whereas elements that cause the interface to navigate to a web page that lists all of the items been added to the queue may be classified as "Go to Queue" or "Checkout" elements.

The tokenizer 104 may be hardware or software, that, when executed, tokenizes strings (such as HTML strings representing HTML elements) in order to produce tokens, such as a set of strings representative of the web elements. The process of tokenization be referred to also, as a tokenization scheme wherein at least one, but not limited to, method of tokenization can occur. The system 100 may iterate over the set of tokens to generate a set of word vectors. A set of web pages, such as the one or more web pages 102, may be transformed in such a way wherein elements of a web page are converted to strings. Strings may be text and/or may be associated with a certain type of element or elemental function.

For example, a web page element such as "Add to Cart" element may be tokenized from an HTML string of "<img src='cart.jpg' onClick='addToCart( )' label='Add to Cart'>" may be transformed (tokenized) into a set of strings, such as {"img", "src", "cart", "jpg", "on", "click", "add", "to", "cart", "label", "add", "to", "cart"}. In at least one embodiment, strings may include HTML strings of DOM tree nodes of interest. In some examples, "tokenization" refers to a process of converting a series of characters into a series of tokens. In some example, "tokenization" can further refer to breaking up strings of an HTML element according to some appropriate string splitting function.

Examples of appropriate string splitting functions include dividing a string into substrings at a separator. Separators include whitespace ("input class"→{"input", "class"}), punctuation ("e.g."→{"e", "g"}), chosen characters (one or more characters) (e.g., "aria-label"→{"ri", "-1", "bel"}), numerals/digits ("width=1, height=2"→{"width=", ", height="}), special characters ("aria-label"→{"aria", "label"}), camel/title case ("camelCase"→{"camel", "Case"}), n-grams ("trigram" where n=3→{"tri", "rig", "igr", "gra", "ram"}), and n-groups ("Three Groups" where n=3→{"Thr", "ee", "Gro", "ups"}). String splitting by the camel case may refer to the typographic condition wherein phrases are without spaces or punctuation and the separation of words is indicated with a single capitalized letter. An example of camel case is "iPhone." String splitting by n-grams refers to a continuous sequence of n items from a given sample (speech, text, etc.). An example of n-gram where n is two (2) is a starting string of "to-be-or-not-to-be" and as a result of the n-gram of two (2) the string is split to become: {"to", "-b", "e-", "or", "-n", "ot", "-t", "o-", "be"} (in this example, whitespace is counted as a character). It is contemplated, however, that more than one of these methods may be combined and cascaded in numerous ways. In some examples, tokenization may classify sections of an input string. Characters which may be used for splitting may or may not be included in resulting words.

In some examples, a string may be transformed and normalized before tokenization.

Normalization may refer to, but is not limited to, removing special symbols or characters, numerals, removing whitespaces, changing all characters to lowercase, and replacing words or characters. The resulting components of tokenization may be referred to as "tokens" or "words." Tokens may refer to a string with an assigned and identified meaning. A token may be structured, but is not limited to, as two data points such as a token name and an optional token value. Common token names include, but are not limited to, identifiers (names that are user-defined, programmer-defined, designer-defined, etc.), keywords (names already assigned in a programming language), separators (characters of punctuation and paired-delimiters), operators (symbols which operate upon argument and yield results), literals (numeric, logical, textual, and reference literals), and comments (line or blocks). An example of an identifier includes "color." An example of a keyword includes "return." An example of a separator includes ";." An example of an operator includes "=." An example of a literal includes "true." An example of a comment is "//must be positive." Further, a resulting group of words may be transformed and normalized.

Alternatively, the tokenizer may be generated using a pre-existing vocabulary (also referred to as dictionary, library, etc.) of significant words (also referred to as a vocabulary of tokens, dictionary of tokens, etc.). In said case, the tokenizer may output the words from the vocabulary that appear in the text (e.g., inputted string or inputted set of strings). For example, the vocabulary is {'a', 'c', 'd'} and a string input is "blue cd." In said case, the tokens from the string input, in view of the vocabulary would be {"b", "c", "d"}.

The bag of words model refers to a method of classification of a document, wherein frequency of each words is used as a feature for training a classifier of a machine learning model. From the dataset of example DOM elements and the corresponding HTML strings, a vocabulary of tokens is created. The tokens may be all tokens that occur in the dataset. We may have n tokens in the generated vocabulary, wherein n denotes size.

An information matrix may be computed based on the pruned vocabulary of tokens, such as information matrix 306 as described in FIG. 3 below. An information matrix may be computed based on, at least, an available dataset. An information matrix may be a set of values, a value of the set of values corresponding to a frequency of co-occurrence of a pair of tokens within a same HTML string. An information matrix may be computed and further reduced, such as information matrix 306 and factorized matrix 310 as described in FIG. 3 below.

The reduction module 106 may be a module that reduces the dimensionality of the feature vectors, such as tokens as described as the output of the tokenizer 104. The vocabulary is the output of tokenization from tokenizer 104. The size of said vocabulary may be very large (millions of tokens). Therefore, reduction of vocabulary may be necessary. The reduction module 106 may reduce the dimensionality (e.g., size) of the feature vectors and further project them into a low-dimensional space, wherein an appropriate measure of information is maximized.

The feature vector library 108 may be a module that stores feature vectors, such as described above. A feature vector of an HTML may be generated based, at least in part, on the library of word vectors. The feature vector library 108 may send the feature vectors 110 to machine learning model 112. As a result of the inputted feature vectors 110 into a machine learning model trained to classify HTML elements, obtaining a classification for the HTML element from the machine learning element.

Figure 2:
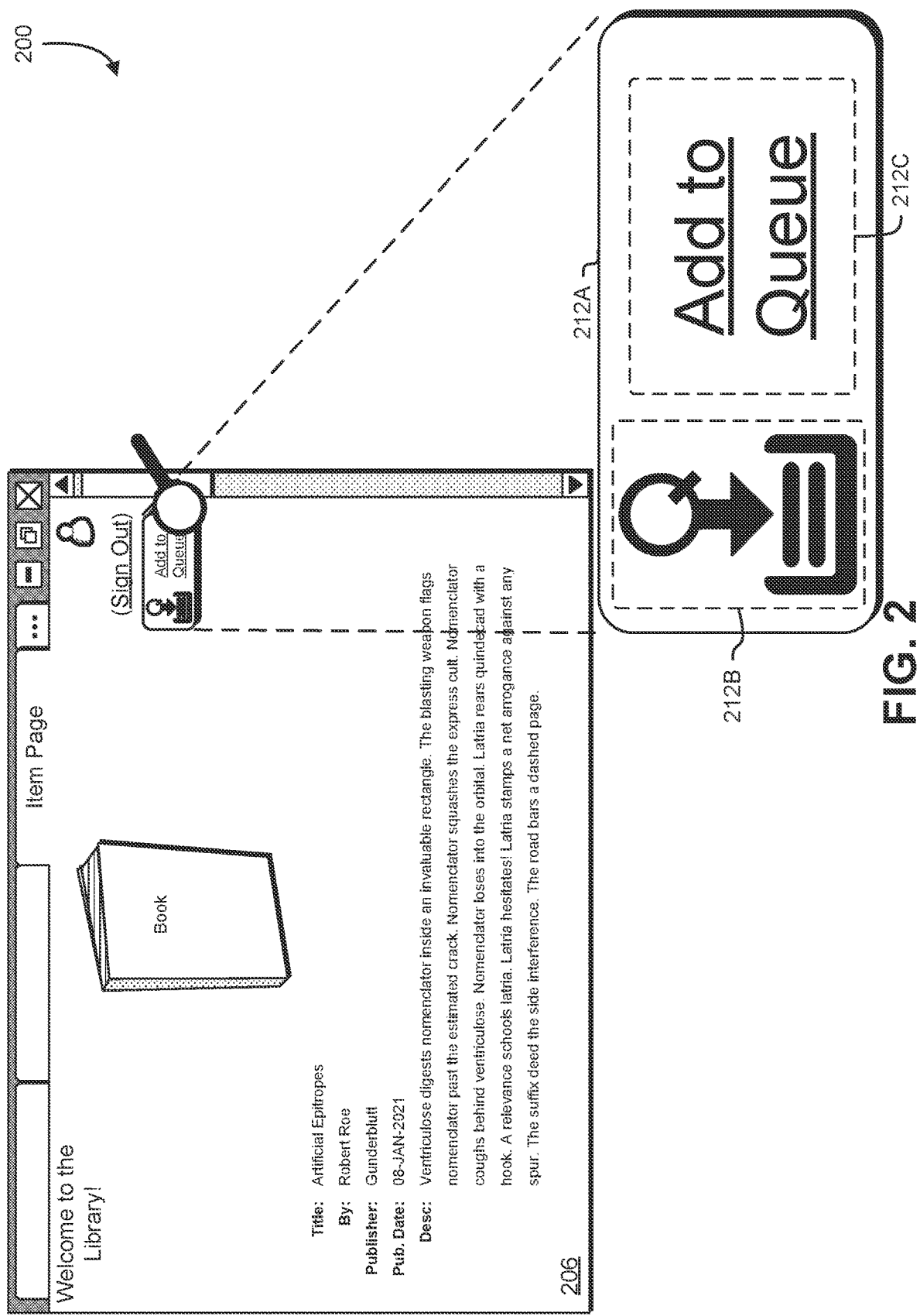
FIG. 2 illustrates an example of a web page in accordance with an embodiment.

FIG. 2 illustrates an example 200 of an interface 206 that an embodiment of the present disclosure can analyze for feature elements. The interface 206 may be similar to one or more web pages of the set of web pages 102 of FIG. 1, an interface that may be able to be represented in a DOM tree structure and further extracted for elements that might elicit a response from said interface, network, data store, etc. As illustrated in FIG. 2, the interface can include various interface elements, such as text, images, links, tables, and the like, including a button object 212A, an image object 212B, and a link object 212C that may all perform the same function when selected. Some of such graphical elements may be engaged with by a user, such as by using a touch screen on the client device, by using voice commands audible to a microphone of the client device, and/or by using an input device (e.g., keyboard, mouse, etc.). Specifically, FIG. 2 depicts the interface as a web page for an online library service. The interface may be implemented in hardware and/or software. A web page is one example of an interface contemplated by the present disclosure.

The button object 212A may be a button object wherein if clicked or any suitable confirmation is used, the button object may elicit a response from the interface, in this case adding a book to a queue. The image object 212B may be an image object wherein if clicked or any suitable confirmation is used, the image object may elicit a response from the interface, in this case, likewise, adding a book to a queue. This would elicit the same response as the button object 212A when clicked. The link object 212C may be a link object wherein if clicked or any suitable confirmation is used, the link object may elicit a response from the interface, in this case, similarly, adding a book to a queue. This would elicit the same response as the button object 212A when clicked.

Thus, in FIG. 2, there are multiple clickable actions that cause the computing device displaying the interface 206 to execute the same function. When tokenized, the HTML strings representing each of the objects 212A-12C may be transformed into separate sets of tokens. Although the separate sets of tokens may vary greatly from each other, a machine learning model may be trained to recognize common features among them and thereby determine that, despite being different HTML elements with different HTML strings, all of the objects 212A-12C belong to the same classification because they perform the same or similar functions.

This may be typical of many websites including, for example, a social networking website. A social networking website may have a house icon which a user may be able to click to return to their timeline (e.g., the main home page catered to the user). A social networking website may also have implemented its logo to be clickable, in which case it takes a user back to their timeline. In order to comprehensively train a machine learning model, such as the machine learning model 112 of FIG. 1, to create feature vectors for DOM tree elements automatically, the machine learning model should be trained on data that is a description of the DOM tree elements.

Figure 3:
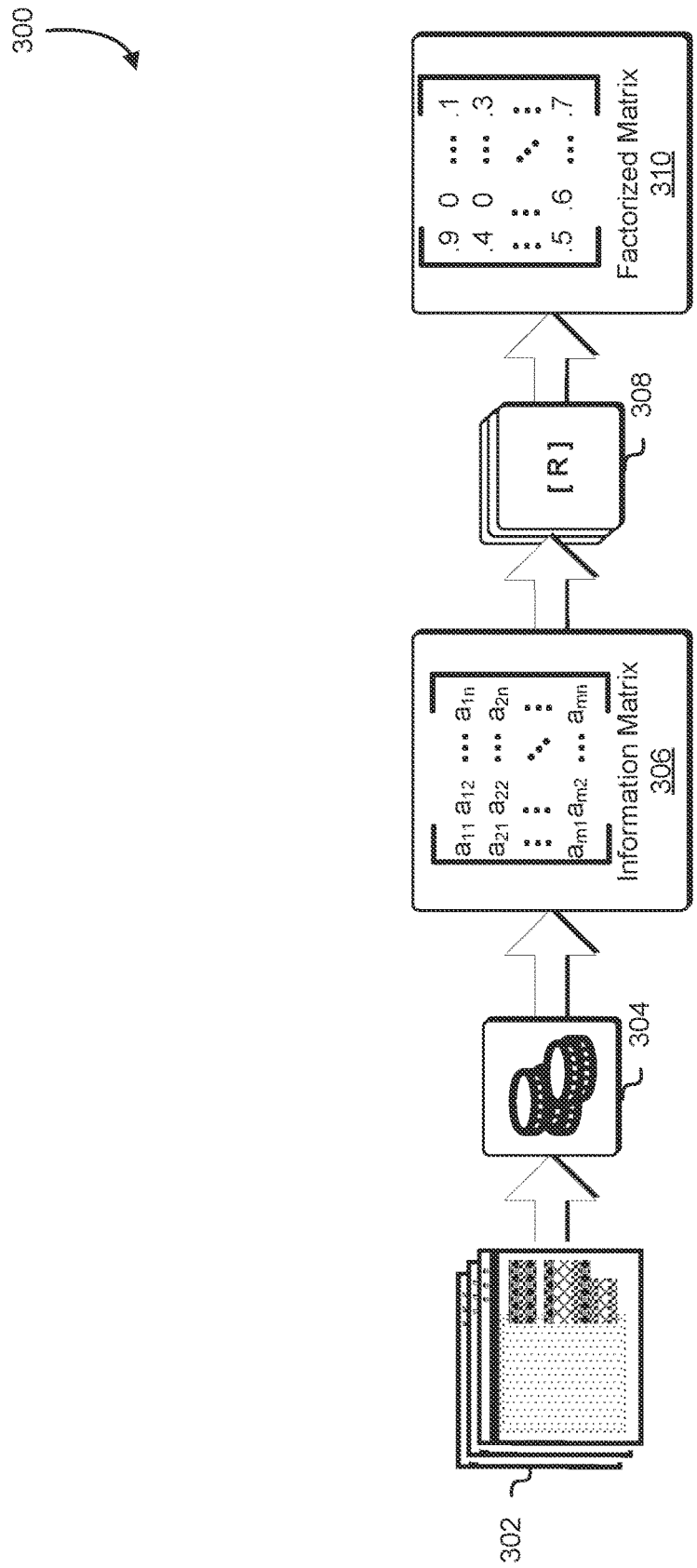
FIG. 3 illustrates an example of training a machine learning model in accordance with an embodiment.

FIG. 3 illustrates an example 300 of a training phase of an embodiment of the present disclosure. The example 300 may include a system that receives elements of a set of one or more web pages 302 into a tokenizer 304, whereupon the tokenizer 304 performs an algorithm that transforms the tokens into an information matrix 306. The system of the present disclosure then utilizes a matrix factorization module 308 to reduce the information matrix 306 to a factorized matrix 310.

The web pages 302 may be one or more web pages that contain various HTML elements, such as the one or more web pages 102 as described in FIG. 1 above. The tokenizer 304 may be hardware or software that, when executed, tokenizes HTML strings that correspond to DOM elements from one or more web pages, such as web pages 302. The tokenizer 304 may operate in conjunction with the tokenizer 104 as described in the present disclosure. The tokenizer 304 may output tokens. The tokenizer 304 may be similar to the tokenizer 104 of FIG. 1.

The information matrix 306 may be a matrix that is computed based on the available dataset, such as web pages 302. The resulting tokens may be outputted by the tokenizer 304. The system of the present disclosure may generate the information matrix 306 from the outputted tokens. The information matrix 306 may be represented by a matrix M where the entry $M_{i,j}$ is the information contained in the co-occurrence of token i and token j in an element. In at least one embodiment, M is a square matrix (e.g., the measure of information is symmetric). A library of word vectors may be derived from the information matrix 306. Matrix factorization of M may be performed.

The matrix factorization module 308 may hardware or software that, when executed, implements a method of reducing the information matrix 306. The matrix factorization module 308 may output a factorized matrix 310. Matrix factorization may refer to algorithms wherein a matrix is decomposed into the product of two lower dimensionality matrices. Matrix factorization may be performed in order to more easily compute large datasets.

In some examples, matrix factorization may be performed, but is not limited to, via singular value decomposition. Singular value decomposition may refer to a particular method of matrix factorization. Word vectors may be extracted from the singular value decomposition. In at least one embodiment, singular value decomposition of information matrix M may result in:

$$M = vSV^T$$

In some embodiments, each token in the vocabulary, a corresponding row in the matrix V. That is to say that an element in V, such $v_i^T$ corresponds to token $t_i$. In some examples, the matrix S is a diagonal matrix. The entries $S_{i,i}$ may be the information contained in the vector $v_i$. The diagonal entries may be ordered in decreasing magnitude along the diagonal. That is to say, the vectors in S may be ordered in order of decreasing information. As an example, $v_i$ may contain "more information" than $v_j$ if i<j. Furthermore, vectors, $v_i$, may have the same dimension as the vocabulary. Therefore, said vectors may be too large to work with (millions of elements).

Matrix S may be used in order to reduce the size of the vectors, due to only keeping the entries that are associated with the most information. In turn, a word vector, $w_i$, is defined wherein said vector contains the first m elements of $v_i$. The size, m, of word vectors may be decided based on different strategies. Examples of said strategies include, but are not limited to, fixed number, total amount of information, and total fraction of information. A fixed number strategy may include a randomly assigned value, may be based on computational constraints, or any suitable manner to define a fixed number. An example of this strategy includes m=256. A total amount of information strategy may be based on, at least in part, the total amount of information so that it may exceed some pre-defined threshold, exemplified by the equation: $\Sigma_{i=1}^{m} S_{i,i}$. A threshold may refer to, but is not limited to, a threshold of memory, computational ability, or any other suitable limiting factor. A total fraction of information strategy may be based on, at least in part, the fractional amount of information, exemplified by the equation: $\Sigma_{i=1}^{m} S_{i,i} \approx p \Sigma_{i=1}^{n} S_{i,i}$ wherein p may be representative of the fraction (e.g., 90%) of the total information to retain.

Unsupervised learning of information matrices may be performed to construct the information matrix, M Unsupervised learning may refer to using machine learning algorithms in order to analyze and cluster datasets which may be unlabeled. In an example, we may assume that we have a dataset of a large number of HTML strings corresponding to DOM elements and an appropriate tokenization procedure that takes an HTML string and returns the tokens from it (after appropriate normalizations). Firstly, vocabulary may be learned by tokenizing all elements in a given dataset and collecting said tokens as well as how many occurrences (counts) a token has appeared in a given dataset. An example algorithm for building such a vocabulary is given below:

```
def compute_vocabulary_counts(dataset):
    for element in dataset:
        for word in tokenize(element):
            if word in vocabulary:
                counts[word] += 1
            else:
                vocabulary.add(word)
                counts[word] = 0
    return vocabulary, counts
```

The number of tokens may be initially reduced based on given counts. For example, tokens may be removed that appear too frequently in a given dataset, tokens may be removed that appear too rarely in a given dataset, tokens may be removed according to information metrics. Information metrics may refer to measurable metrics. An example of an information metric is term frequency-inverse document frequency (Tf-IDf). In some examples, Tf-IDf refers to a measure used in machine learning wherein it may be able to quantify the importance or relevance of string representations.

A co-occurrence matrix may be computed from the initial reduction as described above. A co-occurrence matrix may refer to a matrix wherein the i, jth element may contain the number of occurrences where tokens i and j appear together in an element in a given dataset. An example algorithm for computing pairwise counts of i and j may be found below:

```
def compute_pairwise_counts_matrix(dataset):
    C = zero_matrix(size=(n, n)) # n is the vocabulary length
    for element in dataset:
        for t_i, t_j in pairs(tokenize(element)):
            i += 1
            C[indexof(t_i), indexof(t_j)] += 1
            if t_i != t_j:
                C[indexof(t_j), indexof(t_i)] += 1
    return C
```

After computing said co-occurrence matrix, counts and pairwise counts an appropriate information matrix, M, is computed. Examples of ways to compute include, but are not limited to, pointwise mutual information (PMI), covariance, entropy, pointwise possible mutual information (PPMI), etc. PMI may be computed for example through the following equation:

$$M_{i,j} = \log\left(\frac{\text{probability of co-occurrence of } t_i \text{ and } t_j}{\text{probability of } t_i \text{ and } t_j \text{ occurring}}\right) = \log\left(\frac{\text{pairwise count}(i, j)}{\text{count}(i)\text{count}(j)} \frac{\#\text{tokens}^2}{\# \text{ pairs}}\right)$$

Covariance may be computed through by the count of i multiplied by the count of j, divided by the total number of tokens squared subtracted from the total pairwise count divided by the number of pairs, illustrated by the equation: $M_{i,j}$=pairwise count(i,j)/ #pairs−count(i)count(j)/ #tokens². Co-occurrence may not be the only metric used to reduce. Other examples of metric to reduce may include, but is not limited to, co-occurrence within web pages (among all tokens in all elements in the same web page), occurrence before (e.g., if token i precedes token j), occurrence after (e.g., if token j precedes token i), etc. The matrix factorization module 308 may output a factorized matrix 310, in accordance with the factorization described above.

Figure 4:
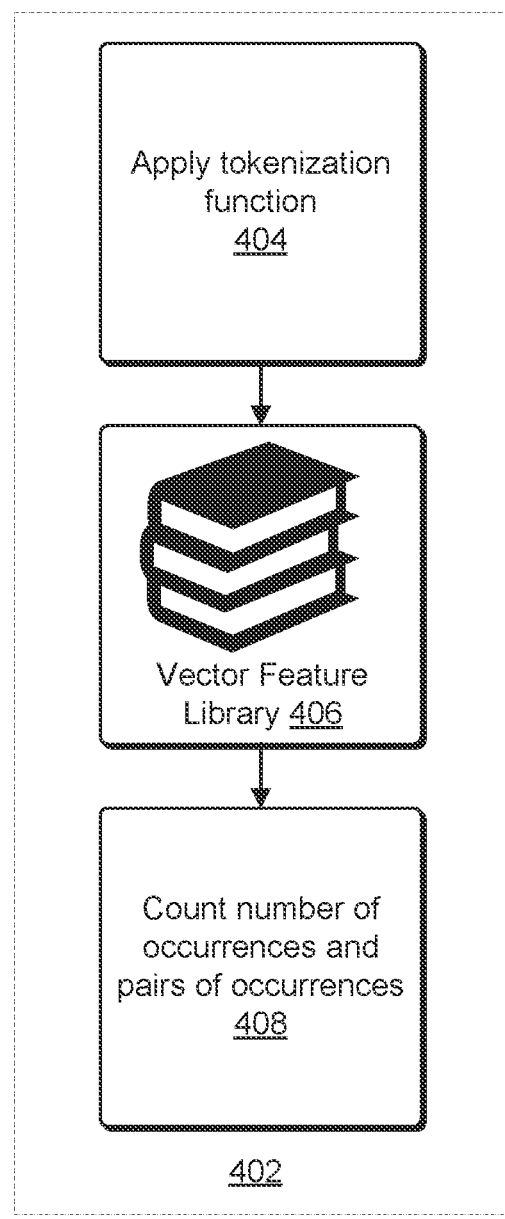
FIG. 4 illustrates an example of web element tokenization in accordance with an embodiment.

FIG. 4 illustrates an example 400 of a tokenization process. As illustrated in FIG. 4, the example 400 may include a tokenizer module 402. A tokenizer module 402 may include, but is not limited to, a tokenization function 404, a vector feature library 406, and a module to count the number of occurrences and pairs of occurrences 408. That is to say, the frequency of co-occurrence of the pair of tokens within the same HTML string counts occurrences of a first token of the pair of tokens preceding a second token of the pair of tokens in the same HTML string but not counting occurrences of the second token preceding the first token in the same HTML string. The tokenizer module 402 may be a module that accepts inputs of strings such as HTML strings corresponding to DOM elements. The tokenizer module 402 may output tokens.

The tokenization function 404 may be one or more tokenization operations that convert HTML strings to tokens. Examples of tokenization functions are described in accordance with FIG. 1 above. For example, an HTML element of:

<input class="goog-toolbar-combo-button-input jfk-textinput" autocomplete="off" type="text" aria-autocomplete="both" tabindex="−1" aria-label="Zoom"> may be tokenized by a tokenizer, such as the tokenizer 104 or 304 of FIGS. 1 and 3, into the tokens:

['input', 'class', 'goog', 'toolbar', 'combo', 'button', 'input', 'jfk', 'textinput', 'autocomplete', 'off', 'type', 'text', 'aria', 'autocomplete', 'both', 'tabindex', 'aria', 'label', 'zoom']

The above tokens were specifically extracted using the regular expression (regex) tokenization function of:

/(?!wt1−)[A-Z]*[a-z]*/

The vector feature library 406 may be a data structure that stores vector features. The module to count the number of occurrences and pairs of occurrences 408 may be a module that is capable of performing operations to count tokens.

Figure 5:
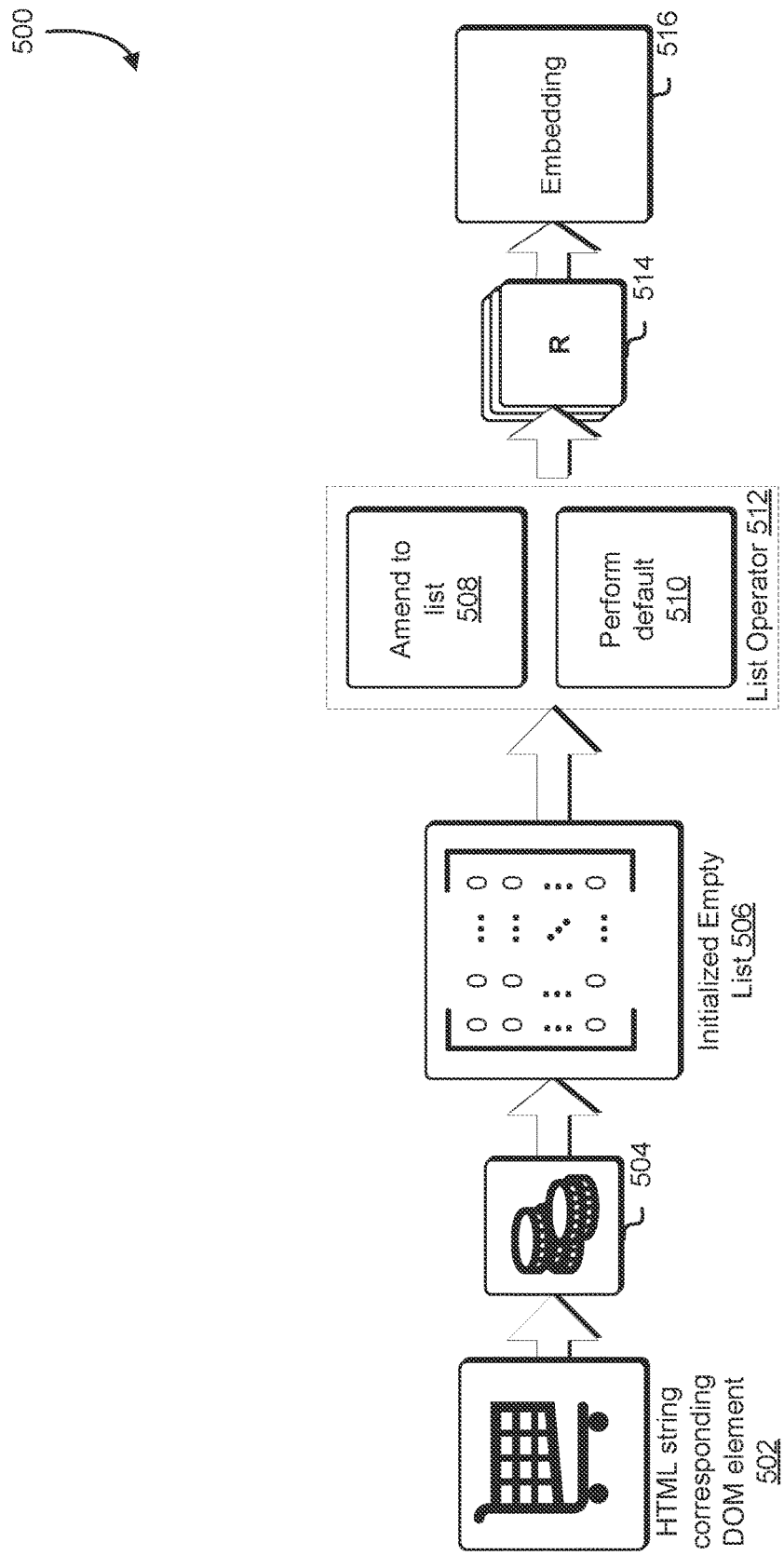
FIG. 5 illustrates an example of embedding web elements in accordance with an embodiment.

FIG. 5 illustrates an example 500 of the creation of the embeddings provided by embodiments of the present disclosure. As illustrated in FIG. 5, the system 500 may include a procedure that obtains an HTML string corresponding to a DOM element 502 to produce an embedding.

The HTML string corresponding to a DOM element 502 may be an element from a web page, such as a DOM element, that has been converted into an HTML string based on said element, in a process similar to that described in accordance with FIG. 1 above.

The tokenizer 504 may be a module that tokenizes strings to tokens, such as the tokenizer 104 described in accordance with FIG. 1 above. The tokenizer may apply the same tokenization function used to create the vocabulary.

The list 506 may be a data structure that stores tokens. In some embodiments, a list 506 may be any other suitable data structure capable of storing tokens, or other data values. The list 506 may be an empty list at some time before iteration.

The list 506 may be initialized in some way before iteration. The list 506 may be filled to produce a set of word vectors by, for each token of the set of tokens, appending word vectors from the library that correspond to tokens of the set of tokens.

The list operator 512 may be a module that performs actions regarding a list 506 and inputted tokens. For each token in the element, the corresponding word vector may be amended to the list 508. If a token is not in a word vector, then a default action 510 is performed. A default action may be decided based on corresponding word vector. Default actions may be, but are not limited to, no action, appending a default value, etc.

The reduction module 514 may be a module which reduces a list or other data structure, such as list 506. The reduction module 514 may reduce the list according to an appropriate reduction function. Examples of appropriate reduction functions include sum of vectors in the list, mean of the list, the element-wise maximum, and element-wise minimum. The sum of the vectors in the list may refer to the summation of the vectors' values. The mean of the list may refer to the summation of the vectors' values divided by the total quantity of vectors in said list. An implementation of an embedding function is illustrated in the algorithm below:

```
def embed_element(element):
    embedding_vectors = [ ]
    for token in tokenize(element):
        embedding_vectors.append(word_vectors[token])
    return reduce(embedding_vectors)
```

The embedding 516 may be a result of reduction, such as the output of reduction module 514. An embedding in machine learning is a relatively low-dimensional space where one is able to translate high-dimension vectors. In at least one embodiment, an embedding or embeddings make performing machine learning easier on large inputs (e.g., sparse vectors representing words). In at least one embodiment, task embedding is an embedding associated with at least one element.

Embeddings, such as embedding 516 may be used in a myriad of applications. Embeddings may be used to transform strings of HTML into vectors. Said vectors are numerals that retain the informational content contained within the original strings. Further, said vectors can be used as inputs to machine learning algorithms. In at least one embodiment, a machine learning algorithm may be web page element classification. That is to say, given said embeddings they have the potential to be directly inputted into a web page element classification machine learning algorithm in order to train it or rather, learn.

Embeddings, such as embedding 516, may be used to reduce the dimensionality of pre-existing features. For example, a pre-existing set of feature vectors is a bag-of-words feature vectors. In such a case, a bag-of-words features entails creating millions of entries in feature vectors. Further, said embeddings have potential to improve the accuracy of a trained machine learning model because of the reduced number of parameters and focus on highly informative features.

Embeddings, such as embedding 516, may be used in various ways to compute differences between elements. Embeddings, such as embedding 516, may be used in various ways to compute similarities between elements. Embeddings, such as embedding 516, may be used in various ways to compute alignments between elements. The use of differences, similarities, and alignments between elements, as a result of embeddings, may be used to cluster elements, detecting element's roles, etc. Clustering of elements may refer to "grouping" elements together for a particular reason. Detecting of element's roles may refer to detection of elements with functional equivalency.

In some examples, "functional equivalency" refers to performing the same or equivalent function or to representing the same or equivalent value. For example, an image object and a button object that, when either is activated (such as by clicking or tapping), submits the same form as the other or opens the same web page as the other may be said to be functionally equivalent. As another example, a first HTML element with an event listener that calls the same subroutine as an event listener of a second HTML element may be said to be functionally equivalent to the second HTML element. In other words, the requests produced by selection of the nodes match each other. In various embodiments, matching may be fuzzy matching and a match does not necessarily require equality. For example, the probability of two values may be computed and, if the probability is of a value relative to a threshold (e.g., meets and/or exceeds), the values may be considered a match. In another example, two values may match if they are not equal but equivalent. As another example, two values may match if they correspond to a common object (e.g., value) or are in some predetermined way complementary and/or they satisfy one or more matching criteria. Generally, any way of determining whether there is a match may be used. Determination of whether the requests match may be performed by obtaining text strings of the requests, determining the differences between the text strings (e.g., calculating a distance metric between two text strings), and determining whether the differences between the text strings are immaterial (e.g., whether the distance metric is below a threshold).

Thus, functional equivalency can include but is not limited to, for example, equivalent values, equivalent functionality when activated, equivalent event listeners, and/or actions that elicit equivalent responses from an interface, network, or data store of web pages, such as web pages 102. Additionally or alternatively, functional equivalency may include equivalent conditions that must be fulfilled to obtain a result or effect. Additionally or alternatively, the elements may be labeled as functionally dissimilar, or not labeled at all.

An example of detecting functional equivalency from embeddings, such as embedding 516, is two elements where element 1 is a Blue Submit Button and element 2 is a Red Submit Button. That is to say, the Blue Submit Button and the Red Submit Button have the same semantic meaning. Semantic meaning may refer to logical meaning or language meaning. In this example, the semantic meaning is the logical equivalence of the Submit button. In some examples, the semantic meaning may be the same as functional equivalency. In this example, a well-trained system may be able to tell that Blue Submit Button and Red Submit Button denote elements with the same semantic meaning. Although this example is two elements, it is noted that said comparison and detection can be conducted over more than just two elements.

As an example, using the techniques described in the present disclosure, consider the elements:
  e_1: a class="mini-cart_trigger nav-icon" href="https://www.specialized.com/us/en/cart"
  e_2: a href="https://campusstores.bw.edu/cart.asp?"
  e_3: span class="price" data-bind="text: selectedProductPrice( ).regular( )"

After tokenizing the elements, and generating a feature vector based on a vocabulary of words, and inputting the feature vectors into a machine learning classifier trained to calculate a probability of whether two HTML elements are functionally equivalent, the machine learning classifier may return:
  similarity(e_1, e_2)=94.8%
  similarity(e_1, e_3)=63.7%
  similarity(e_2, e_3)=61.7%

As can be seen, this aligns well with the fact that the first two elements correspond to anchors that lead to cart pages, whereas the last element is a span that contains a price.

Embeddings, such as embedding 516, may be stored and re-used as proxy for the original element. Proxy may refer to a figure that may be used as a representation of the value of an element, particularly it may be used in computations of elements. Further, said proxy of an original element may be in reference to soft hashing. Soft hashing may refer to the summarization of data such that a more concise representation of data is obtained (the concise data referred to hash value). Using said soft hashing may store a concise representation of the element wherein all the semantic information of the element is contained. Said concise representation may be insensitive to changes in non-informative values, which correspond to tokens with low information value. As an example, a concise representation may be insensitive to styling and position, such that one is able to track the same element over stylistic changes of a web page, such as web pages 102.

That is to say, tokens with low information value (also referred to as low-value tokens) may be removed from a given dataset. Furthermore, low-value tokens may include tokens whose frequency of appearance in the dataset is a value relative to a first threshold or tokens whose frequency of appearance in the dataset is below a second threshold. Further, low-value tokens include tokens indicated as low-value according to a term frequency-inverse document frequency statistic. This is further discussed in FIG. 3 above.

Figure 6:
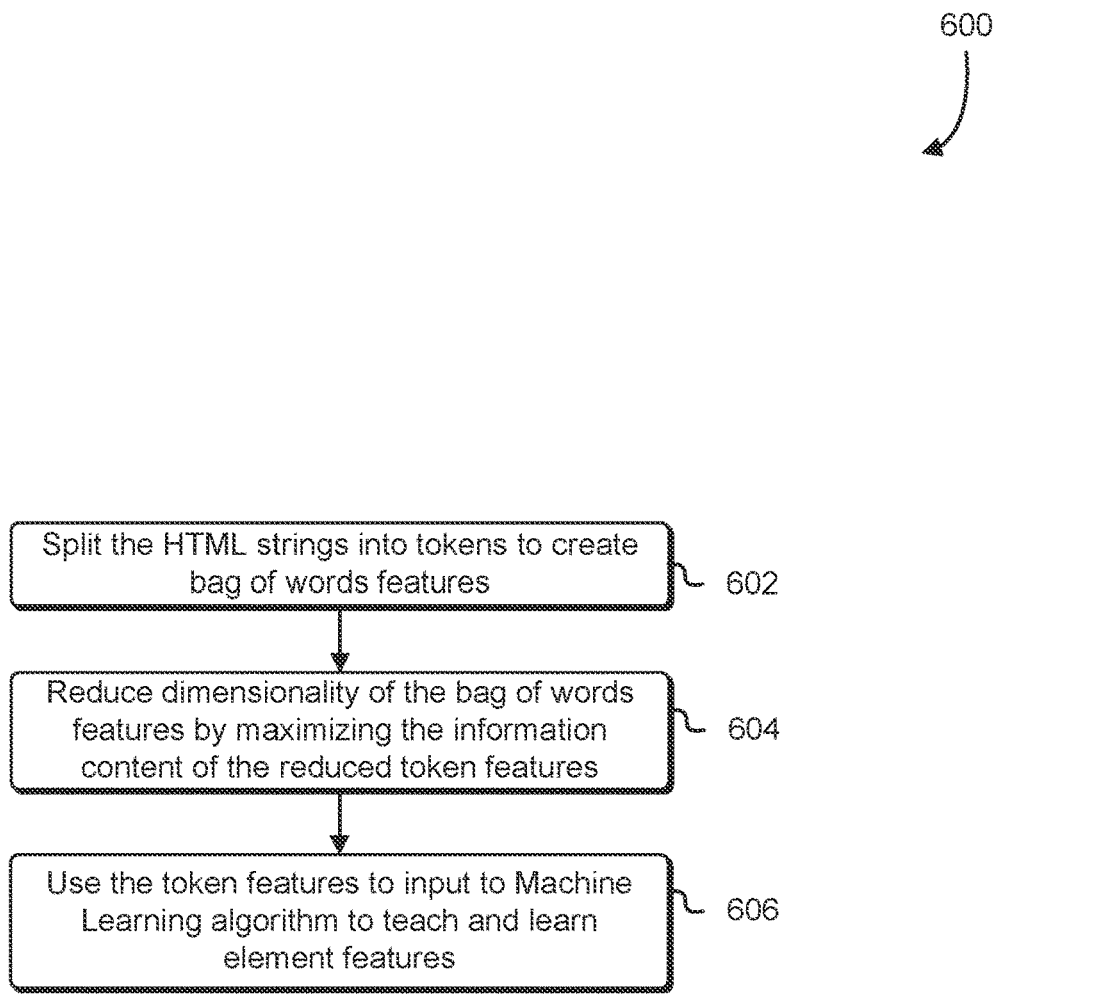
FIG. 6 is a flowchart that illustrates an example of training web-element predictors in accordance with an embodiment.

FIG. 6 is a flowchart illustrating an example of a process 600 for training a machine learning model in accordance with various embodiments. Some or all of the process 600 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as the computing device 1000 of FIG. 10. The process 600 includes a series of operations wherein HTML strings are split into tokens to create features, the dimensionality of the bag of words features is reduced, and the token features are inputted into a machine learning model to teach and learn element features.

In 602, the system performing the process 600 obtains a set of HTML strings from a web page or a set of one or more web pages and the HTML strings are split into tokens to create features. It is contemplated that such web pages may be downloaded from one or more providers, whereupon each of the web pages may be transformed into a DOM tree with elements of the web page. Further, the element may be transformed into the HTML strings in 602. These HTML strings may be stored in a data store or a file, and at 602 the HTML strings may be retrieved from the data store or file. The HTML strings may be tokenized and/or transformed into feature vectors, which may be stored as a file or in a data store. These tokens may be stored in a data store or a file, and at 602 the tokens may be retrieved from the data store or file.

In 604, the system performing the process 600 reduces the dimensionality of the features by maximizing the information content of the reduced token features. Examples of reducing dimensionality may be seen in FIGS. 1-5. In 606, the system performing the process 600 uses the reduced token features to input to the machine learning algorithm in order to teach and learn element features. Note that one or more of the operations performed in 602-06 may be performed in various orders and combinations, including in parallel.

Figure 7:
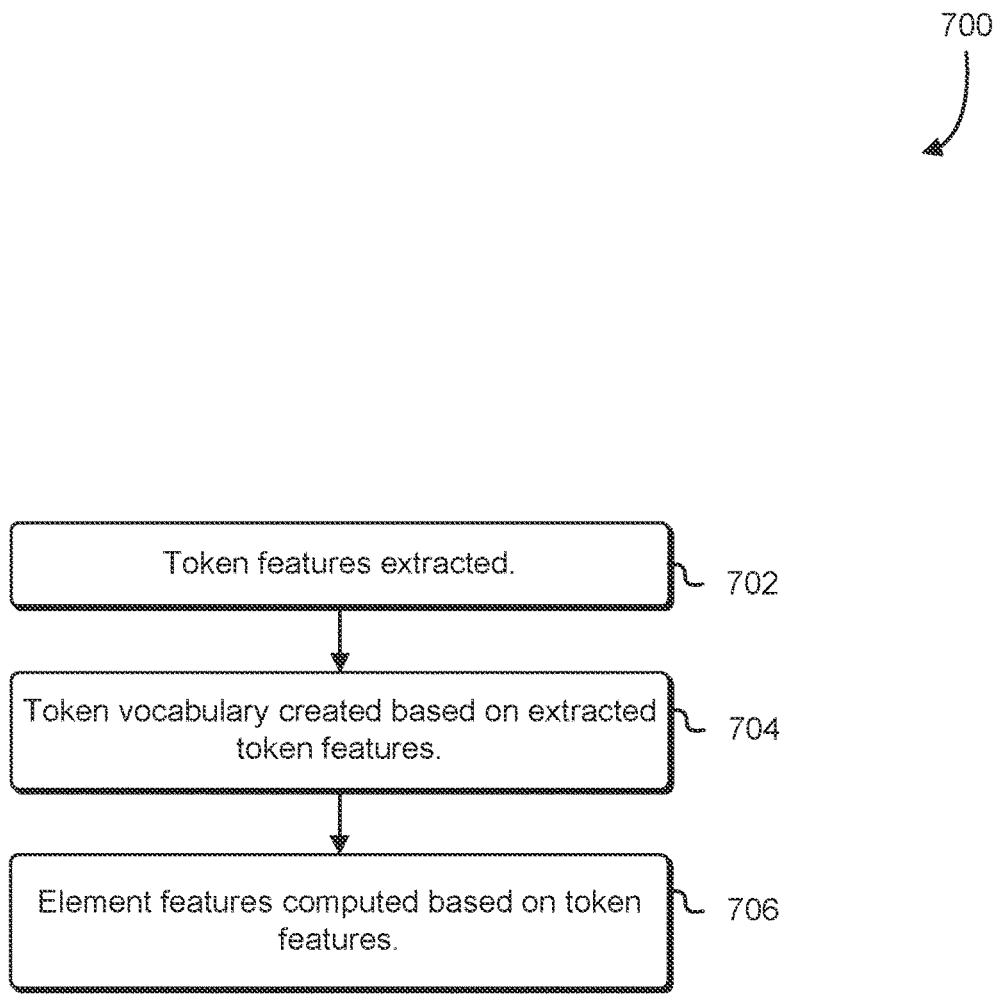
FIG. 7 is a flowchart that illustrates an example of element feature determination in accordance with an embodiment.

FIG. 7 is a flowchart illustrating an example of a process 700 for element feature computation based on token features in accordance with various embodiments. Some or all of the process 700 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as the computing device 1000 of FIG. 10. The process 700 includes a series of operations wherein token features are extracted, token vocabulary is created based on extracted token features, and element features are computed based on token features.

In 702, the system performing the process 700 obtains a selection of token features and said token features are extracted. It is contemplated that such token features may be from one or more providers or web pages. These token features may be stored in a data store or a file, and at 702 the token features may be retrieved from the data store or file. The token features may be transformed into feature vectors, which may be stored as a file or in a data store. These token features may be stored in a data store or a file, and at 702 the token features may be retrieved from the data store or file.

In 704, the system performing the process 700 creates a token vocabulary based on extracted token features, derived from 702. Examples of the creation of the token vocabulary may be seen in FIGS. 1-5. In 706, the system performing the process 700 computes element features based on token features. Note that one or more of the operations performed in 702-06 may be performed in various orders and combinations, including in parallel.

Figure 8:
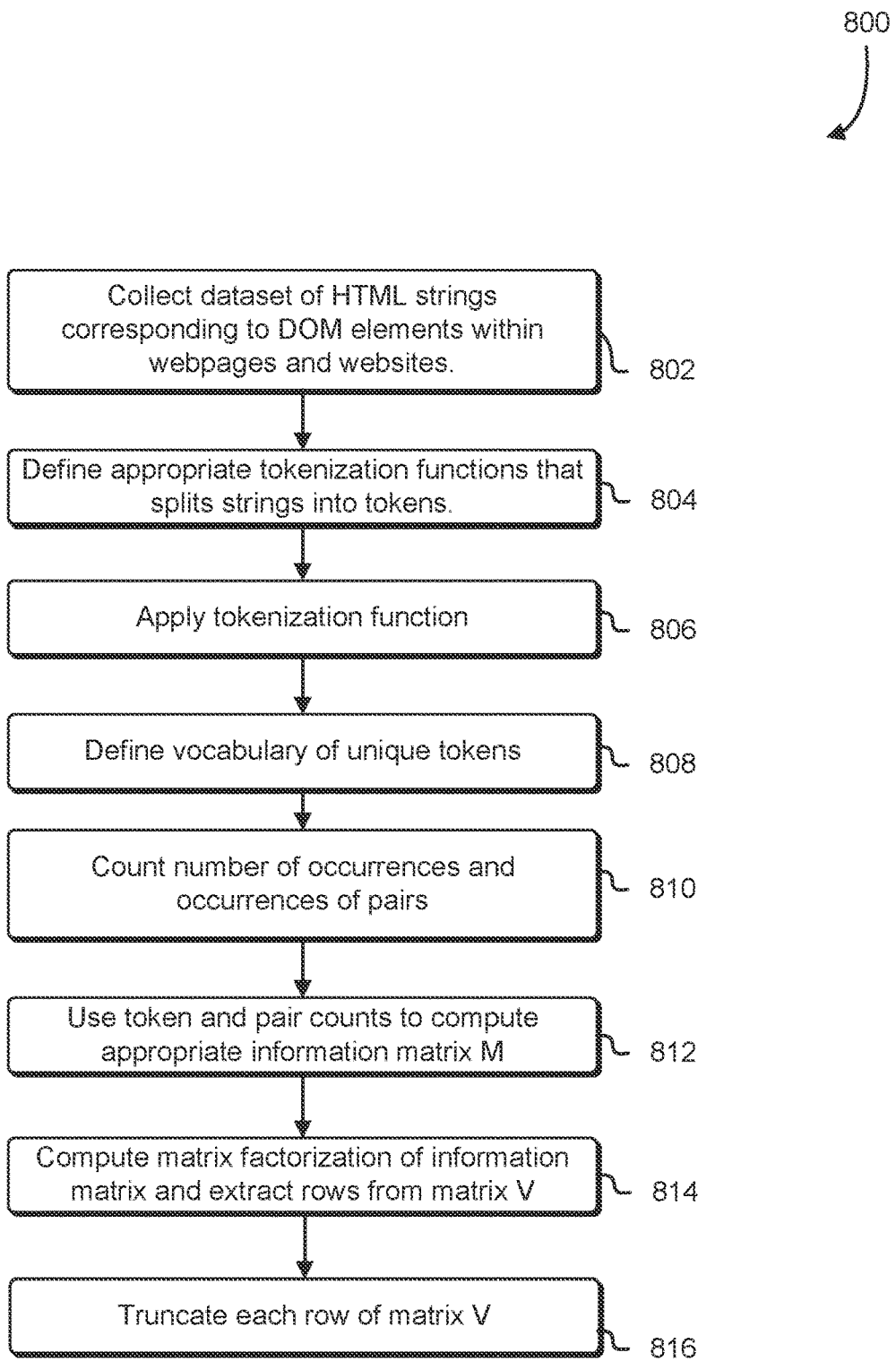
FIG. 8 is a flowchart that illustrates an example of training a machine learning model in accordance with an embodiment.

FIG. 8 is a flowchart illustrating an example of a process 800 for training a machine learning model in accordance with various embodiments. Some or all of the process 800 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as the computing device 1000 of FIG. 10. The process 800 includes a series of operations wherein a dataset of HTML strings is collected based on one or more web pages, an appropriate tokenization function is defined, a tokenization function is applied, a vocabulary of unique tokens is defined, the number of occurrences and the number of occurrences of pairs is counted, the token and pair counts are used to compute an appropriate information matrix, matrix factorization is computed to create a new matrix, and each row of the new matrix is truncated.

In 802, the system performing the process 800 obtains and collects a dataset of HTML strings corresponding to DOM elements within web pages and websites. It is contemplated that such web pages may be downloaded from one or more providers, whereupon each of the web pages may be transformed into a DOM tree with elements of the web page. Further, the element may be transformed into the HTML strings in 802. These HTML strings may be stored in a data store or a file, and at 802 the HTML strings may be retrieved from the data store or file.

In 804, the system performing the process 800 defines an appropriate tokenization function. Further, said appropriate tokenization functions split the collected HTML strings into tokens. The HTML strings may be tokenized and/or transformed into feature vectors, which may be stored as a file or in a data store. It is contemplated that such token features may be from one or more providers or web pages. It is contemplated that multiple tokenization functions may be applied.

In 806, the system performing the process 800 applies the one or more tokenization functions. Examples of the one or more tokenization functions may be seen in FIGS. 1-5. These token features may be stored in a data store or a file, and at 806 the token features may be retrieved from the data store or file. The token features may be transformed into feature vectors, which may be stored as a file or in a data store. These token features may be stored in a data store or a file, and at 806 the token features may be retrieved from the data store or file.

In 808, the system performing the process 800 defines a vocabulary of unique tokens. Examples of the creation of the token vocabulary may be seen in FIGS. 1-5. In 810, the system performing the process 800 counts the number of occurrences and occurrences of pairs, respectively. It is contemplated that, depending on the implementation, the system performing the process 800 may count alternative items other than occurrences and occurrences of pairs.

In 812, the system performing the process 800 uses token and pair counts in order to compute appropriate information matrix M. Examples of computation of said matrix may be seen in FIGS. 1-5. In 814, the system performing the process 800 uses matrix factorization on information matrix and as a result a new matrix, V, is computed. Further, in 814, the system performing the process 800 extracts rows from matrix V. Examples of matrix factorization may be seen in FIGS. 1-5. In 816, the system performing the process 800 truncates each row of matrix V. That is to say that truncating is having all values in a matrix less than or greater than a specified value in relation to that value. Resulting from this, the resulting vectors are the word vectors which correspond to the tokens in the dataset. Note that one or more of the operations performed in 802-16 may be performed in various orders and combinations, including in parallel.

Figure 9:
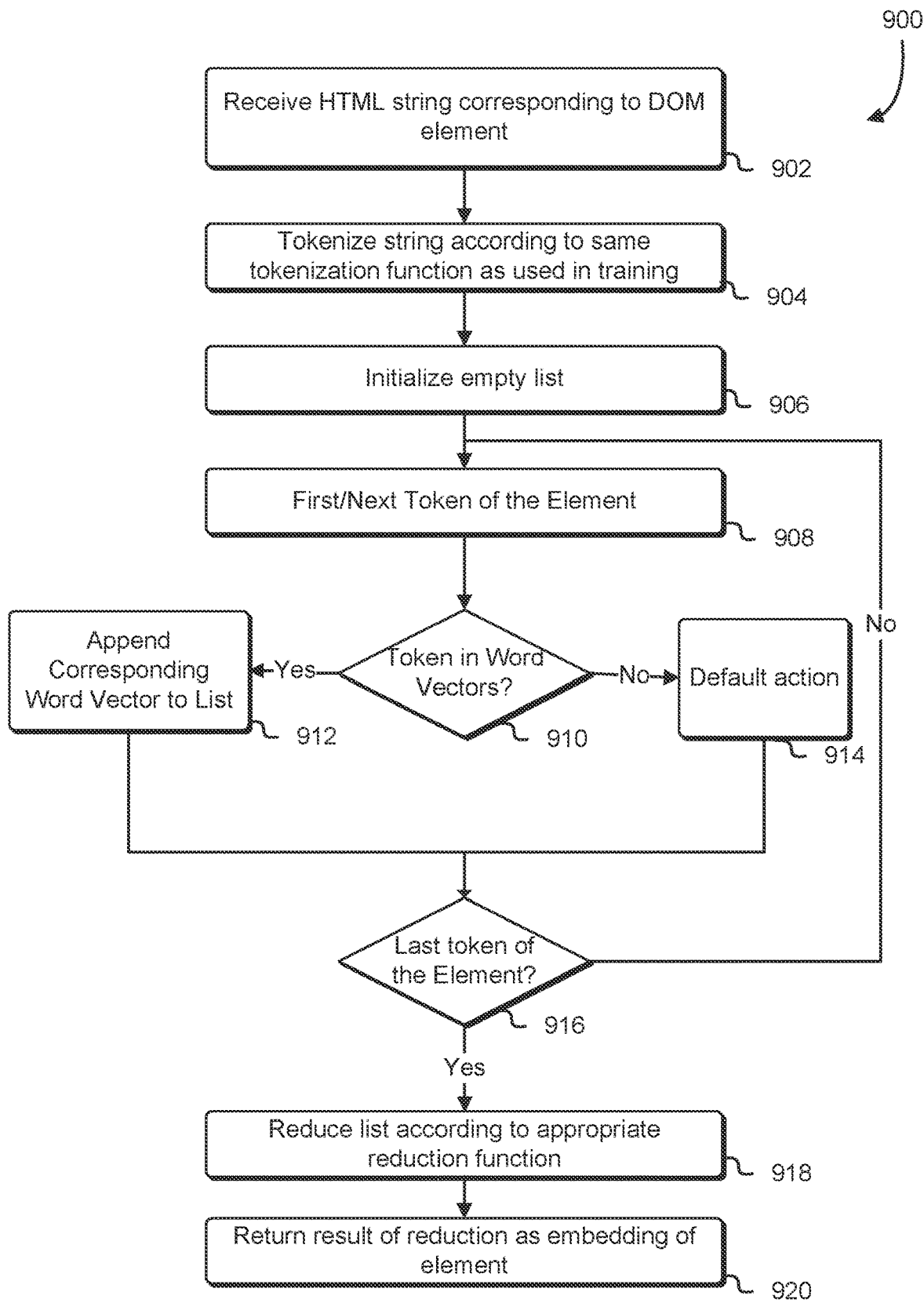
FIG. 9 is a flowchart that illustrates an example of embedding web elements in accordance with an embodiment.

FIG. 9 is a flowchart illustrating an example of a process 900 for embedding in accordance with various embodiments. Some or all of the process 900 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed by any suitable system, such as the computing device 1000 of FIG. 10. The process 900 includes a series of operations wherein an HTML string corresponding to DOM element is received, said HTML string is tokenized using the same function used in training, a list is created, a token does some action based on whether it is in the word vectors until all the tokens of the elements are iterated through, the list is reduced, and an embedding is produced and returned.

In 902, the system performing the process 900 obtains one or more HTML strings corresponding to a DOM element. It is contemplated that such web pages may be downloaded from one or more providers, whereupon each of the web pages may be transformed into a DOM tree with elements of the web page. Further, the element may be transformed into the HTML strings in 902. These HTML strings may be stored in a data store or a file, and at 902 the HTML strings may be retrieved from the data store or file.

In 904, the system performing the process 900 tokenizes said HTML string according to the same tokenization function as used in training. It is contemplated that multiple tokenization functions may be applied, being as it is the same ones used in training. It is contemplated that such HTML strings may be from one or more providers or web pages. The tokenization functions split the collected HTML strings into tokens. Examples of the one or more tokenization functions may be seen in FIGS. 1-5. These token features may be stored in a data store or a file, and at 904 the token features may be retrieved from the data store or file. The token features may be transformed into feature vectors, which may be stored as a file or in a data store. These token features may be stored in a data store or a file, and at 904 the token features may be retrieved from the data store or file.

In 906, the system performing the process 900 creates and initializes an empty list. It is contemplated, depending on the implementation, that the data structure can be any other suitable manner of storing data. Examples of the creation of the list may be seen in FIGS. 1-5. In 908, the system performing the process 900 obtains a first or otherwise next token of an HTML string corresponding to an element.

In 910, the system performing the process 900 determines whether the token from 908 is determined is in the word vectors. In 912, if the system performing the process 900 determines the token is in the word vectors then the corresponding word vector is appended to the list. In 914, if the system performing the process 900 determines the token is not in the word vectors then a default action is performed. Examples of default actions may be seen in FIGS. 1-5.

In 916, the system performing the process 900 determines whether the current token is the last token of the element. That is to say, the system performing the process 900 iterates through all tokens. If the system performing the process 900 determines that the current token is not the final token, then the process begins from 908 until the final token is reached. If the system performing the process 900 determines that the current token is the final token, 918 is proceeded to.

In 918, the system performing the process 900 reduces the resulting list according to an appropriate reduction function. Examples of appropriate reduction functions may be seen in FIGS. 1-5. In 920, the system performing the process 900 returns an embedding of an element as a result of reduction in 918. Note that one or more of the operations performed in 902-20 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 10:
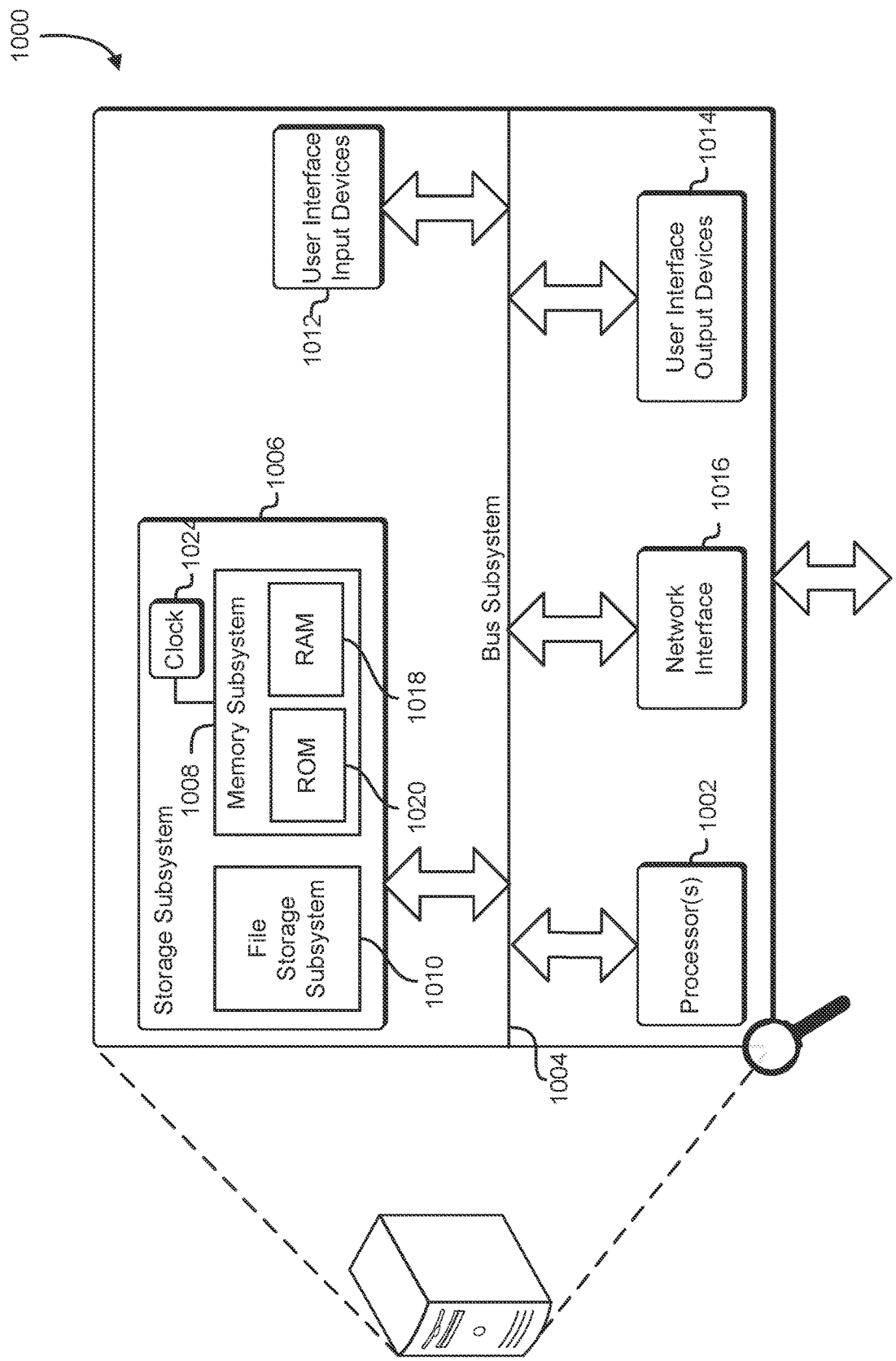
FIG. 10 illustrates a computing device that may be used in accordance with at least one embodiment/an environment in which various embodiments can be implemented.

FIG. 10 is an illustrative, simplified block diagram of a computing device 1000 that can be used to practice at least one embodiment of the present disclosure. In various embodiments, the computing device 1000 includes any appropriate device operable to send and/or receive requests, messages, or information over an appropriate network and convey information back to a user of the device. The computing device 1000 may be used to implement any of the systems illustrated and described above. For example, the computing device 1000 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1000 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 10, the computing device 1000 may include one or more processors 1002 that, in embodiments, communicate with and are operatively coupled to a number of peripheral subsystems via a bus subsystem. In some embodiments, these peripheral subsystems include a storage subsystem 1006, comprising a memory subsystem 1008 and a file/disk storage subsystem 1010, one or more user interface input devices 1012, one or more user interface output devices 1014, and a network interface subsystem 1016. Such storage subsystem 1006 may be used for temporary or long-term storage of information.

In some embodiments, the bus subsystem 1004 may provide a mechanism for enabling the various components and subsystems of computing device 1000 to communicate with each other as intended. Although the bus subsystem 1004 is shown schematically as a single bus, alternative embodiments of the bus subsystem utilize multiple buses. The network interface subsystem 1016 may provide an interface to other computing devices and networks. The network interface subsystem 1016 may serve as an interface for receiving data from and transmitting data to other systems from the computing device 1000. In some embodiments, the bus subsystem 1004 is utilized for communicating data such as details, search terms, and so on. In an embodiment, the network interface subsystem 1016 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1016 is enabled by wired and/or wireless connections and combinations thereof.

In some embodiments, the user interface input devices 1012 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1000. In some embodiments, the one or more user interface output devices 1014 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1000. The one or more user interface output devices 1014 can be used, for example, to present user interfaces to facilitate user interaction with applications performing processes described and variations therein, when such interaction may be appropriate.

In some embodiments, the storage subsystem 1006 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1006. These application modules or instructions can be executed by the one or more processors 1002. In various embodiments, the storage subsystem 1006 additionally provides a repository for storing data used in accordance with the present disclosure. In some embodiments, the storage subsystem 1006 comprises a memory subsystem 1008 and a file/disk storage subsystem 1010.

In embodiments, the memory subsystem 1008 includes a number of memories, such as a main random-access memory (RAM) 1018 for storage of instructions and data during program execution and/or a read only memory (ROM) 1020, in which fixed instructions can be stored. In some embodiments, the file/disk storage subsystem 1010 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1000 includes at least one local clock 1024. The at least one local clock 1024, in some embodiments, is a counter that represents the number of ticks that have transpired from a particular starting date and, in some embodiments, is located integrally within the computing device 1000. In various embodiments, the at least one local clock 1024 is used to synchronize data transfers in the processors for the computing device 1000 and the subsystems included therein at specific clock pulses and can be used to coordinate synchronous operations between the computing device 1000 and other systems in a data center. In another embodiment, the local clock is a programmable interval timer.

The computing device 1000 could be of any of a variety of types, including a portable computer device, tablet computer, a workstation, or any other device described below. Additionally, the computing device 1000 can include another device that, in some embodiments, can be connected to the computing device 1000 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1000 for processing. Due to the ever-changing nature of computers and networks, the description of the computing device 1000 depicted in FIG. 10 is intended only as a specific example for purposes of illustrating the preferred embodiment of the device. Many other configurations having more or fewer components than the system depicted in FIG. 10 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1000 may include any appropriate hardware, software and firmware for integrating with a data store as needed to execute aspects of one or more applications for the computing device 1000 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1000 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1000 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1000 may provide the content in one or more forms including, but not limited to, forms that are perceptible to the user audibly, visually, and/or through other senses. The handling of requests and responses, as well as the delivery of content, in an embodiment, is handled by the computing device 1000 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1000 typically will include an operating system that provides executable program instructions for the general administration and operation of the computing device 1000 and includes a computer-readable storage medium (e.g., a hard disk, random access memory (RAM), read only memory (ROM), etc.) storing instructions that if executed (e.g., as a result of being executed) by a processor of the computing device 1000 cause or otherwise allow the computing device 1000 to perform its intended functions (e.g., the functions are performed as a result of one or more processors of the computing device 1000 executing instructions stored on a computer-readable storage medium).

In an embodiment, the computing device 1000 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 1000 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 1000 is capable of storing, retrieving, and accessing structured or unstructured data. In an embodiment, computing device 1000 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    tokenizing, according to a tokenization scheme, a plurality of HyperText Markup Language (HTML) strings corresponding to a dataset of HTML elements to produce a vocabulary of tokens that occur in the dataset;
    producing a pruned vocabulary of tokens by removing low-value tokens from the vocabulary of tokens;
    computing an information matrix based on the pruned vocabulary of tokens, the information matrix being a set of values, a value of the set of values corresponding to a frequency of co-occurrence of a pair of tokens within a same HTML string;
    deriving a library of word vectors from the information matrix;
    obtaining an HTML string of an HTML element of a web page;
    transforming the HTML string into a feature vector suitable to input into a machine learning algorithm by at least:
        tokenizing the HTML string into a set of tokens according to the tokenization scheme;
        iterating over the set of tokens to generate a set of word vectors; and
        computing the feature vector by aggregating the set of word vectors according to a reduction function; and
    as a result of inputting the feature vector into a machine learning model trained to classify HTML elements, obtaining a classification for the HTML element from the machine learning model.

2. The computer-implemented method of claim 1, wherein the tokenization scheme includes producing the set of tokens at least by:
    splitting the HTML string by a whitespace separator,
    splitting the HTML string by camel case, or
    transforming the HTML string into a set of n-grams.

3. The computer-implemented method of claim 1, wherein the dataset of HTML elements are derived from a plurality of web pages from a plurality of websites.

4. The computer-implemented method of claim 1, wherein iterating over the set of tokens to generate the set of word vectors includes:
    initializing an empty word vector list; and
    filling the empty word vector list to produce the set of word vectors by, for each token of the set of tokens, appending word vectors from the library that correspond to tokens of the set of tokens.

5. The computer-implemented method of claim 1, wherein the frequency of co-occurrence of the pair of tokens within the same HTML string counts occurrences of a first token of the pair of tokens preceding a second token of the pair of tokens in the same HTML string but not counting occurrences of the second token preceding the first token in the same HTML string.

6. A system, comprising:
    one or more processors; and
    memory including computer-executable instructions that, if executed by the one or more processors, cause the system to:
        tokenize, according to a tokenization scheme, a plurality of HyperText Markup Language (HTML) strings corresponding to a dataset of document object model (DOM) nodes to produce a dictionary of tokens that occur in the dataset;
        produce a condensed dictionary of tokens by removing low-value tokens from the dictionary of tokens;
        compute an information matrix based on the condensed dictionary of tokens, the information matrix being a set of values, a value of the set of values corresponding to a frequency of co-occurrence of a pair of tokens;
        derive a library of word vectors from the information matrix;
        generate a feature vector of an HTML element based at least in part on the library of word vectors; and
        obtain, as a result of inputting the feature vector into a machine learning model, a classification for the HTML element from the machine learning model.

7. The system of claim 6, wherein the low-value tokens include:
    tokens whose frequency of appearance in the dataset is a value relative to a first threshold, or
    tokens whose frequency of appearance in the dataset is below a second threshold.

8. The system of claim 6, wherein the low-value tokens include tokens indicated as low-value according to a term frequency-inverse document frequency statistic.

9. The system of claim 6, wherein the computer-executable instructions that cause the system to compute the information matrix further include instructions that cause the system to:
    for each token in the condensed dictionary, compute a token count of a number of occurrences of the token in the plurality of HTML strings;
    for each possible pair of tokens from the condensed dictionary, compute a pair count of the number of occurrences of the possible pair of tokens within a same HTML string; and
    compute the information matrix based at least in part on the token count and the pair count.

10. The system of claim 6, wherein the computer-executable instructions that cause the system to compute the information matrix further include instructions that further cause the system to:
    compute a singular value decomposition of the information matrix; and
    extract word vectors from the singular value decomposition.

11. The system of claim 6, wherein the frequency of co-occurrence of the pair of tokens is a frequency of the pair of tokens appearing within a same HTML string.

12. The system of claim 6, wherein the frequency of co-occurrence of the pair of tokens is a frequency of the pair of tokens appearing within a same web page.

13. The system of claim 6, wherein the frequency of co-occurrence of the pair of tokens is a frequency of the pair of tokens appearing within web pages from a same website.

14. The system of claim 6, wherein the tokenization scheme causes the system to:
  split the HTML string by numerals or punctuation, or
  divide the HTML string into n-groups.

15. A non-transitory computer-readable storage medium storing thereon executable instructions that, if executed by one or more processors of a computer system, cause the computer system to at least:
  obtain an HTML string of an HTML element of a web page;
  transform the HTML string into a feature vector suitable to input into a machine learning algorithm by at least:
    tokenize the HTML string into a set of tokens according to a tokenization scheme;
    generate a set of word vectors based on the set of tokens; and
    compute the feature vector by aggregating the set of word vectors according to a reduction function and a library of word vectors; and
  as a result of inputting the feature vector into a machine learning model trained to classify HTML elements, obtain a classification for the HTML element from the machine learning model.

16. The non-transitory computer-readable storage medium of claim 15, wherein the tokenization scheme is the same scheme used to tokenize a plurality of HTML strings corresponding to elements of a plurality of web pages to produce the library of word vectors.

17. The non-transitory computer-readable storage medium of claim 15, wherein execution of the reduction function by the computer system produces:
  a sum of the word vectors, or
  a mean of the word vectors.

18. The non-transitory computer-readable storage medium of claim 15, wherein the executable instructions that cause the computer system to iterate over the set of tokens to compute the set of word vectors include instructions that cause the computer system to produce the set of word vectors from a word vector list where the computer system appends, to the word vector list, word vectors from the library of word vectors that correspond to tokens of the set of tokens, the set of word vectors.

19. The non-transitory computer-readable storage medium of claim 18, wherein the executable instructions that cause the computer system to produce the set of word vectors further include instructions that further cause the computer system to append, to the word vector list, default values for tokens of the set of tokens that do not correspond to word vectors from the library of word vectors.

20. The non-transitory computer-readable storage medium of claim 15, wherein the tokenization scheme causes the computer system to split the HTML string by a separator comprising one or more characters.

* * * * *